Oct. 24, 1950      R. W. BOWCOTT      2,526,929
AIRPLANE FLAP EXTENSION

Filed May 29, 1948      2 Sheets-Sheet 1

INVENTOR.
ROBERT W. BOWCOTT

BY *Richard W. Treverton*

ATTORNEY.

Oct. 24, 1950 R. W. BOWCOTT 2,526,929
AIRPLANE FLAP EXTENSION
Filed May 29, 1948 2 Sheets-Sheet 2

INVENTOR.
ROBERT W. BOWCOTT
BY Richard W. Treverton
ATTORNEY.

Patented Oct. 24, 1950

2,526,929

UNITED STATES PATENT OFFICE 2,526,929

AIRPLANE FLAP EXTENSION

Robert W. Bowcott, Columbus, Ohio, assignor to Curtiss-Wright Corporation, a corporation of Delaware Application May 29, 1948, Serial No. 30,050

8 Claims. (Cl. 244—42)

1

The present invention relates to airplane wing flaps and similar airfoil surfaces, and has particular relation to means for preventing spillage of air around the ends of such surfaces when they are moved divergently from adjacent surfaces of the airplane.

With high lift flaps of the type which move rearwardly as they deflect downwardly, in cases where the trailing edge of the wing sweeps forward from a fuselage or nacelle having a generally upright surface adjacent the end of the flap, the extension of the flap in a direction normal to the wing trailing edge results in such end of the flap diverging from such upright surface. This provides a gap between the flap and the fuselage or nacelle surface through which air may spill with resulting loss of lift of the wing and also a larger drag to lift ratio, the latter being especially undesirable where the flaps are extended for takeoff. A similar situation exists when the flap movement is in the direction of the line of flight but where the adjacent upright surface of the fuselage or nacelle is angularly related to such line.

The primary object of the present invention is to provide a spanwise extension of the flap which will act to substantially close such a gap caused by divergence of the end of the flap and the adjacent upright surface. The extension constitutes a member arranged to telescope into the flap in a spanwise direction, and preferably is mounted for such telescoping movement by a suitable system of tracks and rollers disposed within the flap. The protruding end of the telescoping member is preferably provided with rollers for engagement with the adjacent upright surface of the airplane, and springs or equivalent resilient means are provided to constantly urge the member to a position wherein the rollers are so engaged. The mounting for the telescoping member is such that the latter may have angular as well as linear motion relative to the flap, so that the rollers may follow the contour of the upright surface which in some cases may be curved.

The foregoing and other objects and advantages will become apparent from the following description of the typical embodiment of the invention shown in the accompanying drawings, wherein.

Figure 1:
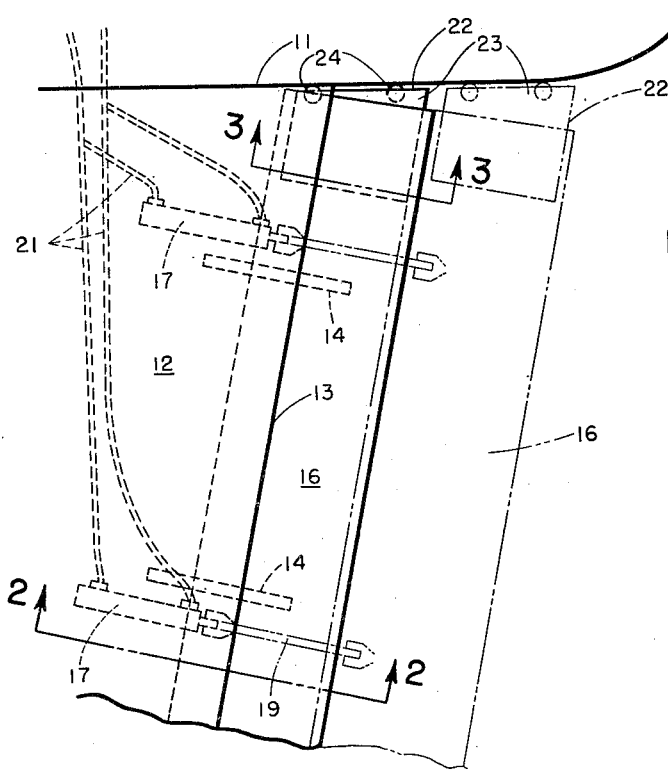
Figure 1 is a plan view of the parts of the airplane to which the invention is applied.
Figure 2:
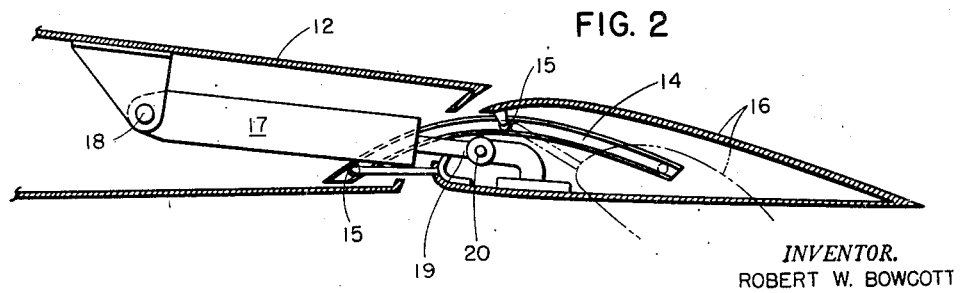
Figure 2 is a sectional view on a larger scale taken approximately along line 2—2 of Figure 1.
Figure 3:
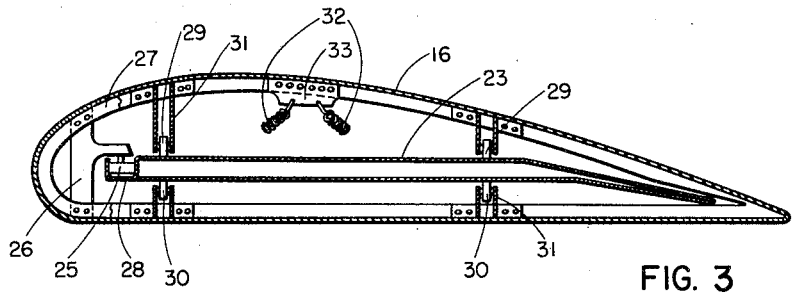
Figure 3 is a sectional view on a still larger scale taken approximately along line 3—3 of Figure 1.

As shown in Figure 1 the aircraft has a fuselage or nacelle having a substantially upright and longitudinally extended surface 11 adjacent one end, in this case the root end, of a wing panel 12 whose trailing edge sweeps forwardly from the root toward the tip. The wing is provided with suitable guideways 14 for rollers 15 that are mounted on brackets attached to a high lift flap 16 which is disposed at the trailing edge of the wing. Power means are provided to move the flap along the guideways between its forward or retracted position shown in full lines in Figures 1 and 2 and its extended position shown in broken lines in those views, the direction of movement being substantially normal to the trailing edge 13. These power means for operating the flap may comprise a plurality of hydraulic struts having cylinders 17 pivoted at 18 to the wing 12 and piston rods 19 pivoted at 20 to the flap 16. The power means may be operated in the usual manner to extend or retract the hydraulic struts, by directing fluid pressure in the desired direction through conduits 21 which connect the ends of the cylinders to suitable valve means and pressure source, not shown.

It will be seen that as the flap 16 extends the end 22 thereof diverges from upright surface 11, providing a gap which of course is widest when the flap is fully extended. According to the present invention this gap is substantially closed by a member designated 23 mounted for telescoping movement in a generally spanwise direction within the flap 16, the protruding end of the member being provided with anti-friction rollers 24 which enable it to roll along the upright surface 11 of the airplane as the flap extends or retracts.

The means illustrated for mounting the flap for such telescoping movement comprise a roller 25, carried by a bracket 26 mounted on one of the ribs 27 of the flap, and a guide channel 28 for the roller formed at the forward edge of the member 23. The mounting means further comprise rollers 29 and 30 carried by supports 31 extended between ribs 27, these rollers 29 and 30 respectively engaging the upper and lower surfaces of member 23. Springs 32 tensioned between brackets 33 on one rib 27 and brackets 34 on the member 23 constantly urge outward telescopic movement of the latter to retain rollers 24 in contact with upright surface 11.

Figure 4:
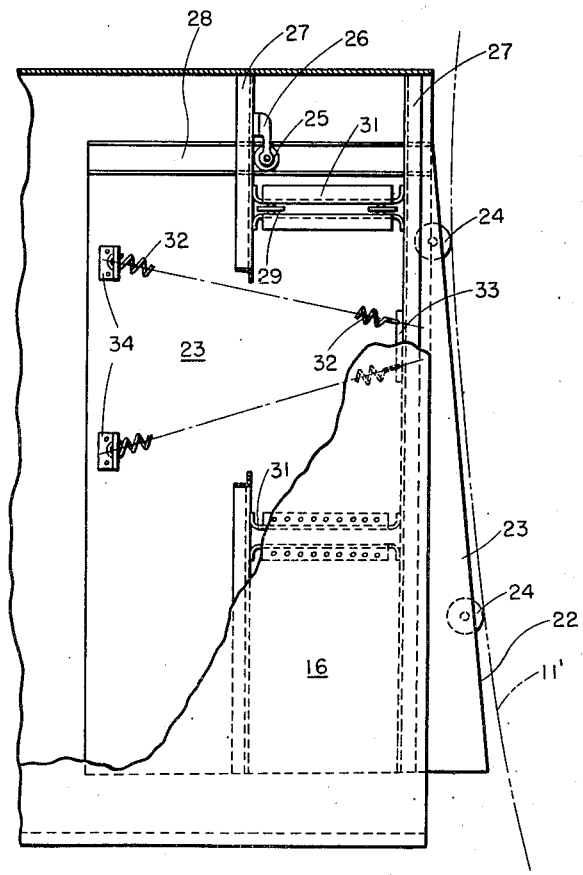
Figure 4 is a plan view, with parts broken away and appearing in section, of the end of the flap provided with the telescoping extension member.

It will be seen that the mounting arrangement shown enables the member to move not only linearly, spanwise of the flap 16, but also enables it to have a certain amount of angular movement about the axis of roller 25 so that the rollers 24 may follow the surface 11 as the flap is extended and retracted even though the surface 11 is substantially curved as indicated by broken line 11' in Figure 4. If such curvature is substantial the adjacent edge of the member 23 may of course be similarly curved to thereby reduce the gap which otherwise would exist.

From the foregoing it will be understood that the member 23 will function in any position of the flap, between and including its fully extended and fully retracted position, to substantially close the gap between the flap end and the adjacent upright surface of the airplane, with resulting improvement in the lift and drag characteristics of the aircraft. It will be understood further that while the structure shown in the attached drawings illustrates the principles of the invention, the latter are susceptible of embodiment in various other physical arrangements without departing from the spirit of the invention or from the scope of the appended claims.

I claim as my invention:

1. In an aircraft having a body with a substantially upright and curved side surface, a first airfoil extending from said body in a spanwise direction and having an auxiliary airfoil mounted thereon for extension from one edge thereof in a direction generally longitudinal of the aircraft, the end of said auxiliary airfoil adjacent said surface moving in a path which diverges from said surface as the auxiliary airfoil is extended, the combination therewith comprising: a member for telescoping movement with respect to said auxiliary airfoil in a direction generally spanwise of the latter, said member projecting beyond said end of the auxiliary airfoil and having rollers on the projecting end thereof for engaging and rolling upon said surface as the auxiliary airfoil is moved, guide rollers carried by said auxiliary airfoil and engaging the upper and lower surfaces of said member for supporting the latter for said telescoping movement, a guideway extending substantially spanwise on said member and a roller carried by said auxiliary airfoil and engaging said guideway for further supporting said member for said telescoping movement, the axis of rotation of said last mentioned roller being substantially normal to the plane of the auxiliary airfoil and constituting an axis about which the member may pivot in order that the rollers on the member may follow the curvature of said surface, and spring means acting between said auxiliary airfoil and said member for urging telescoping movement of the latter to retain the last mentioned rollers upon said surface.

2. In an aircraft having a body with a substantially upright and curved side surface, a first airfoil extending from said body in a spanwise direction and having an auxiliary airfoil movably mounted adjacent one edge thereof, one end of said auxiliary airfoil in one position thereof being adjacent said surface and moving in a path which diverges from said surface as the auxiliary airfoil is moved relative to said first airfoil from said one position, the combination therewith comprising: a member for telescoping movement with respect to said auxiliary airfoil in a direction generally spanwise of the latter, said member projecting beyond said end of the auxiliary airfoil and having roller means on the projecting end thereof for engaging and rolling upon said surface as the auxiliary airfoil is moved, guide rollers carried by said auxiliary airfoil and engaging the upper and lower surfaces of said member for supporting the latter for said telescoping movement, a guideway extending substantially spanwise on said member and a roller carried by said auxiliary airfoil and engaging said guideway for further supporting said member for said telescoping movement, the axis of rotation of said last mentioned roller being substantially normal to the plane of the auxiliary airfoil and constituting an axis about which the member may pivot in order that said roller means on the member may follow the curvature of said surface, and resilient means acting upon said member for urging said telescoping movement thereof to retain said roller means upon said surface.

3. In an aircraft having a body with a substantially upright and curved side surface, a first airfoil extending from said body in a spanwise direction and having an auxiliary airfoil movably mounted adjacent one edge thereof, one end of said auxiliary airfoil in one position thereof being adjacent said surface and moving in a path which diverges from said surface as the auxiliary airfoil is moved relative to said first airfoil from said one position, the combination therewith comprising: a member for telescoping movement with respect to said auxiliary airfoil in a direction generally spanwise of the latter, said member projecting beyond said end of the auxiliary airfoil and having roller means on the projecting end thereof for engaging and rolling upon said surface as the auxiliary airfoil is moved, means supporting said member for said telescoping movement, said supporting means including a guideway extending substantially spanwise on said member and a roller carried by said auxiliary airfoil and engaging said guideway, the axis of rotation of said roller being substantially normal to the plane of the auxiliary airfoil and constituting an axis about which the member may pivot in order that said roller means on the member may follow the curvature of said surface, and means for retaining said roller means in engagement upon said surface in the various positions of movement of said auxiliary airfoil.

4. In an aircraft having a body with a substantially upright and curved side surface, a first airfoil extending from said body in a spanwise direction and having an auxiliary airfoil movably mounted adjacent one edge thereof, one end of said auxiliary airfoil in one position thereof being adjacent said surface and moving in a path which diverges from said surface as the auxiliary airfoil is moved relative to said first airfoil from said one position, the combination therewith comprising: a member for telescoping movement with respect to said auxiliary airfoil in a direction generally spanwise of the latter, said member projecting beyond said end of the auxiliary airfoil and having the projecting end thereof engaging said surface as the auxiliary airfoil is moved, means supporting said member for said telescoping movement, said supporting means including a guideway extending substantially spanwise on said member and a roller carried by said auxiliary airfoil and engaging said guideway, the axis of rotation of said last mentioned roller being substantially normal to the plane of the auxiliary airfoil and constituting an axis about which the member may pivot in order that said projecting end thereof may follow the curvature of said surface, and means acting upon said member for retaining said projecting end thereof in contact with said surface in various positions of the auxiliary airfoil.

5. In an aircraft having a body with a substantially upright side surface, a first airfoil extending from said surface in a spanwise direction and having an auxiliary airfoil movably mounted adjacent one edge thereof, one end of said auxiliary airfoil in one position thereof being adjacent said surface and moving in a path which diverges from said surface as the auxiliary airfoil is moved relative to said first airfoil from said one position, the combination therewith comprising: a member mounted for movement with respect to said auxiliary airfoil in a direction generally spanwise of the latter, said member projecting beyond said end of the auxiliary airfoil and having roller means on the projecting end thereof for engaging and rolling upon said surface as the auxiliary airfoil is moved, and means acting upon said member for retaining said roller means in contact with said surface as the auxiliary airfoil moves toward and from said one position thereof.

6. In an aircraft having a body with a substantially upright side surface, a first airfoil extending from said surface in a spanwise direction and having an auxiliary airfoil movably mounted adjacent one edge thereof, one end of said auxiliary airfoil in one position thereof being adjacent said surface and moving in a path which diverges from said surface as the auxiliary airfoil is moved relative to said first airfoil from said one position, the combination therewith comprising: a member mounted for movement with respect to said auxiliary airfoil in a direction generally spanwise of the latter, said member projecting beyond said end of the auxiliary airfoil and the projecting end thereof engaging and moving upon said surface as the auxiliary airfoil is moved, and means acting upon said member for retaining said projecting end thereof in contact with said surface as the auxiliary airfoil moves toward and from said one position thereof.

7. In an aircraft having a body with a substantially upright side surface and a wing extending in a spanwise direction from said surface, a flap mounted on the wing for extension in a direction generally longitudinal of the aircraft, and the flap mounting being so arranged that the end of the flap adjacent said surface moves in a path which diverges from the surface as the flap extends, the combination therewith comprising: a member mounted for telescoping movement with respect to said flap in a direction generally spanwise of the latter, said member projecting beyond said end of the flap into engagement with said surface, and means acting upon said member for retaining the projecting end thereof in substantial contact with said surface in the various positions of extension of the flap.

8. In an aircraft having a body with a substantially upright side surface and a wing extending in a spanwise direction from said surface, a flap mounted on the wing for extension in a direction generally longitudinal of the aircraft, and the flap mounting being so arranged that the end of the flap adjacent said surface moves in a path which diverges from the surface as the flap extends, the combination therewith comprising: a member mounted for telescoping movement with respect to said flap in a direction generally spanwise of the latter, said member projecting beyond said end of the flap into proximity with said surface, and being provided with bearing means for moving contact with said surface, and means acting upon said member for retaining said bearing means thereof in substantial contact with said surface in the various positions of extension of the flap.

ROBERT W. BOWCOTT.

REFERENCES CITED

The following references are of record in the file of this patent:

UNITED STATES PATENTS

| Number | Name | Date |
| --- | --- | --- |
| 1,736,300 | Wilford | Nov. 19, 1929 |
| 2,075,788 | Adams | Apr. 6, 1937 |
| 2,112,154 | Hall | Mar. 22, 1938 |
| 2,333,482 | Zittman | Nov. 2, 1943 |